United States Patent
Lee

(10) Patent No.: US 10,073,651 B2
(45) Date of Patent: Sep. 11, 2018

(54) MEMORY SYSTEM WITH POWER-OFF DETECTION AND RECOVERY MECHANISM

(71) Applicant: SK hynix Inc., Gyeonggi-do (KR)

(72) Inventor: Jong-Min Lee, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/602,784

(22) Filed: May 23, 2017

(65) Prior Publication Data

US 2018/0081552 A1  Mar. 22, 2018

(30) Foreign Application Priority Data

Sep. 19, 2016  (KR) .................. 10-2016-0119344

(51) Int. Cl.
*G11C 29/52* (2006.01)
*G06F 3/06* (2006.01)
*G06F 11/14* (2006.01)

(52) U.S. Cl.
CPC ............ *G06F 3/065* (2013.01); *G06F 3/0604* (2013.01); *G06F 3/064* (2013.01); *G06F 3/0619* (2013.01); *G06F 3/0659* (2013.01); *G06F 3/0685* (2013.01); *G06F 11/1451* (2013.01); *G06F 11/1469* (2013.01); *G06F 2201/805* (2013.01); *G06F 2201/82* (2013.01)

(58) Field of Classification Search
CPC ...... G06F 3/065; G06F 3/0604; G06F 3/0619; G06F 3/064; G06F 3/0659; G06F 3/0685; G06F 11/1451; G06F 11/1469
USPC .................................................. 365/189.011
See application file for complete search history.

(56) References Cited

U.S. PATENT DOCUMENTS

| | | | | |
|---|---|---|---|---|
| 7,299,314 B2* | 11/2007 | Lin | ..................... | G11C 16/0416 365/185.01 |
| 7,719,890 B2* | 5/2010 | Gorobets | ............ | G06F 11/1441 365/185.04 |
| 8,151,034 B2* | 4/2012 | Gorobets | ............ | G06F 11/1441 365/131 |
| 9,659,658 B2* | 5/2017 | Kim | ................... | G11C 16/0483 |
| 2004/0145952 A1* | 7/2004 | Chen | ................... | G06F 11/1068 365/185.33 |
| 2005/0144362 A1* | 6/2005 | Lin | ..................... | G11C 16/0416 711/103 |
| 2009/0067241 A1* | 3/2009 | Gorobets | ............ | G06F 11/1441 365/185.04 |

(Continued)

FOREIGN PATENT DOCUMENTS

| | | |
|---|---|---|
| KR | 1020130128694 | 11/2013 |
| KR | 1020150053092 | 5/2015 |
| KR | 1020150130638 | 11/2015 |

*Primary Examiner* — Uyen B Tran
*Assistant Examiner* — Xiaochun L Chen
(74) *Attorney, Agent, or Firm* — IP & T Group LLP

(57) ABSTRACT

A memory system may include: a memory device including a plurality of memory blocks each memory block having a plurality of pages; and a controller suitable for performing a plurality of operations to first memory blocks among the memory blocks at a first time, recording a checkpoint information for the operations in the memory blocks, selecting second memory blocks among the first memory blocks through the checkpoint information at a second time after a power-off in the memory system while performing the operations, and performing a dummy write operation to the second memory blocks.

14 Claims, 12 Drawing Sheets

(56) References Cited

U.S. PATENT DOCUMENTS

| | | | |
|---|---|---|---|
| 2009/0070748 A1* | 3/2009 | Lin | G06F 11/1441 717/130 |
| 2015/0127887 A1* | 5/2015 | Kim | G11C 5/143 711/103 |
| 2015/0146486 A1* | 5/2015 | Wu | G11C 16/3459 365/185.04 |
| 2015/0332770 A1* | 11/2015 | Kim | G11C 16/0483 365/185.12 |

* cited by examiner

FIG. 8

| Operating Index(802) | Block Index(804) | Start(806) | End(808) | |
|---|---|---|---|---|
| User data Operation (810) | Block 10 | 1 | 1 | ~812 |
| | Block 11 | 1 | 0 | ~814 |
| | Block 12 | 0 | 0 | ~816 |
| Map data Operation (820) | Block 13 | 1 | 0 | ~822 |
| | Block 14 | 1 | 0 | ~824 |
| GC Operation (830) | Block 15 | 1 | 0 | ~832 |
| | Block 16 | 1 | 1 | ~834 |
| ⋮ | ⋮ | ⋮ | ⋮ | |

800

MEMORY SYSTEM WITH POWER-OFF DETECTION AND RECOVERY MECHANISM

CROSS-REFERENCE TO RELATED APPLICATION

This application claims priority under 35 U.S.C. § 119 to Korean Patent Application No. 10-2016-0119344 filed on Sep. 19, 2016 in the Korean Intellectual Property Office, the disclosure of which is incorporated herein by reference in its entirety.

TECHNICAL FIELD

Exemplary embodiments relate to a memory system, and more particularly, to a memory system which processes data to and from a memory device, and an operating method thereof.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces and solid state drives (SSD).

SUMMARY

Various embodiments are directed to a memory system capable of quickly and stably processing data thereto and therefrom, and an operating method thereof.

In an embodiment, a memory system may include: a memory device including a plurality of memory blocks each memory block having a plurality of pages; and a controller suitable for performing a plurality of operations to first memory blocks among the memory blocks at a first time, recording a checkpoint information for the operations in the memory blocks, selecting second memory blocks among the first memory blocks through the checkpoint information at a second time after a power-off in the memory system while performing the operations and performing a dummy write operation to the second memory blocks.

The checkpoint information may indicate starts and ends of the operations to the first memory blocks.

The second memory blocks may be memory blocks to which corresponding operations had been started but had not been completed at the first time based on the recorded checkpoint information.

The controller may perform the dummy write operation by writing dummy data into pages next to pages to which the corresponding operations were being performed at the first time among pages included in the second memory blocks.

The controller may further perform a recovery operation to the first memory blocks after the dummy writing operation.

The controller may record the checkpoint information in at least one of a header region and a tail region of a page included in the first memory blocks.

The controller may record the checkpoint information in a page included in a dedicated memory block among the memory blocks.

The checkpoint information may be configured in at least one of a list table form and a bitmap form.

The checkpoint information may include indexes indicating the operations, indexes indicating the first memory blocks, and information indicating the starts and the ends of the operations.

The operations may include at least one among a user data operation, a map data operation and a background operation.

In an embodiment, a method for operating a memory system including a plurality of memory blocks each memory block having a plurality of pages, the method may include: performing a plurality of operations to first memory blocks among the memory blocks at a first time, recording a checkpoint information for each of the operations in the memory blocks, selecting second memory blocks among the first memory blocks through the checkpoint information at a second time after a power-off in the memory system while performing the operations, and performing a dummy write operation to the second memory blocks.

The checkpoint information may indicate starts and ends of the operations to the first memory blocks.

The selecting of the second memory blocks may include selecting as the second memory blocks memory blocks to which corresponding operations had been started but had not been completed at the first time based on the recorded checkpoint information.

The performing of the dummy write operation may include writing dummy data into pages next to pages to which the corresponding operations were being performed at the first time among pages included in the second memory blocks.

The method may further include performing a recovery operation to the first memory blocks after performing of the dummy writing operation.

The checkpoint information may be recorded in at least one of a header region and a tail region of a page included in the first memory blocks.

The checkpoint information may be recorded in a page included in a dedicated memory block among the memory blocks.

The checkpoint information may be configured in at least one of a list table form and a bitmap form.

The checkpoint information may include indexes indicating the operations, indexes indicating the first memory blocks, and information indicating the starts and the ends of the operations.

The operations may include at least one among a user data operation, a map data operation and a background operation.

BRIEF DESCRIPTION OF THE DRAWINGS

These and other features and advantages of the present invention will become apparent to those skilled in the art to which the present invention pertains from the following detailed description in reference to the accompanying drawings, wherein:

FIGS. 5 to 8 are schematic diagrams illustrating a data processing operation to a memory device in a memory system in accordance with an embodiment.

DETAILED DESCRIPTION

Figure 1:
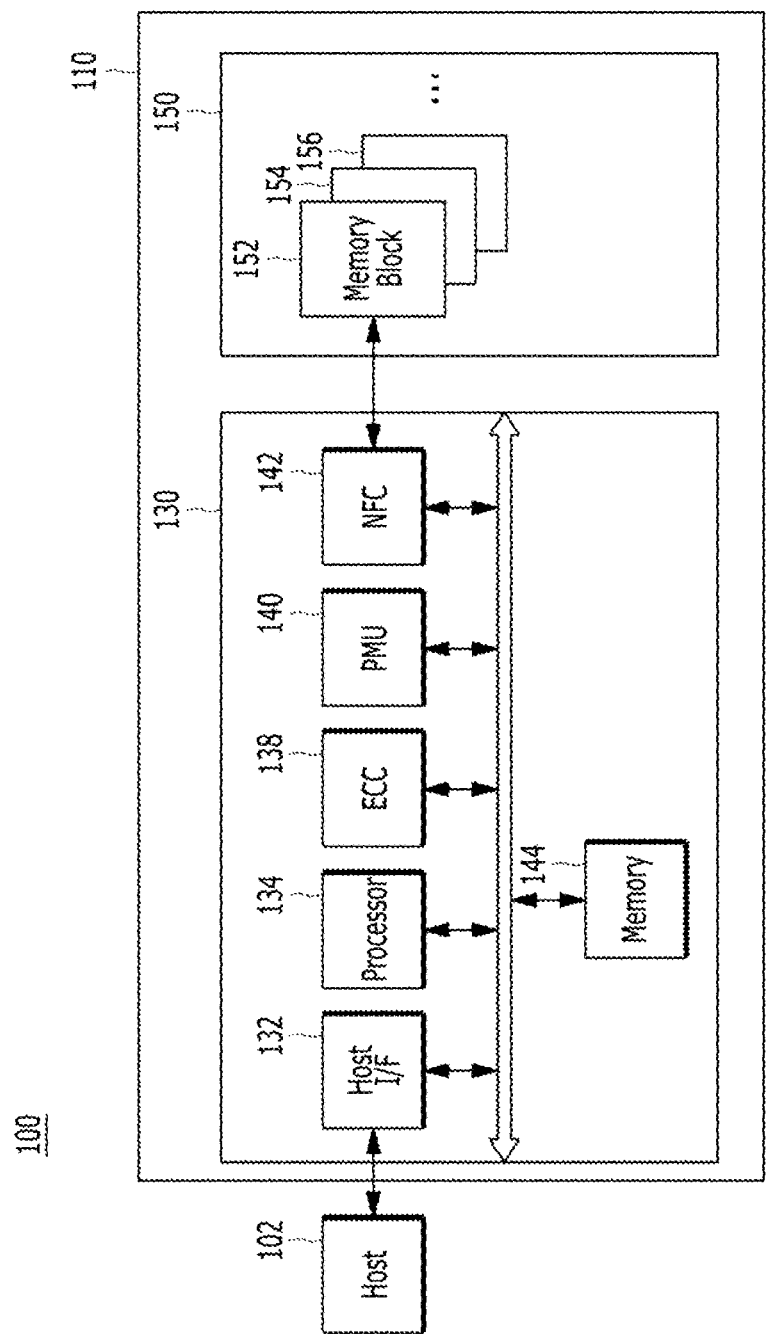
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a data processing system 100 including a memory system 100 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request of the host 102. Non-limited examples of the memory system 110 may include solid state drive (SSD), multi-media card (MMC), secure digital (SD) card, universal storage bus (USB) device, universal flash storage (UFS) device, compact flash (CF) card, smart media card (SMC), personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as DRAM dynamic random access memory (DRAM) and static RAM (SRAM) and nonvolatile memory devices such as read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magnetoresistive RAM (MRAM), resistive RAM (RRAM) and flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDDC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
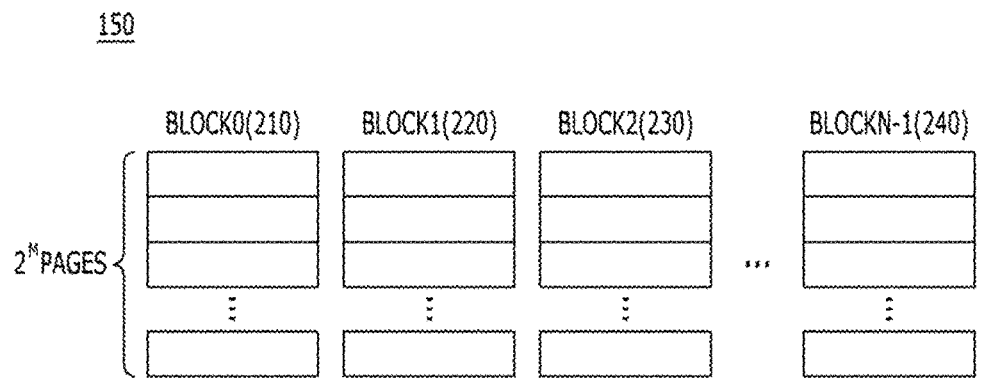
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N-1 and each of the blocks 0 to N-1 may include a plurality of pages, for example, $2^M$ pages, the number of which may vary according to circuit design. Memory cells included in the respective memory blocks 0 to N-1 may be one or more of a single level cell (SLC) storing 1-bit data, and a multi-level cell (MLC) storing 2 or more bit data. An MLC storing 3-bit data is also referred to as a triple level cell (TLC) and an MLC storing 4-bit data is also referred to as a quadruple level cell (QLC).

Figure 3:
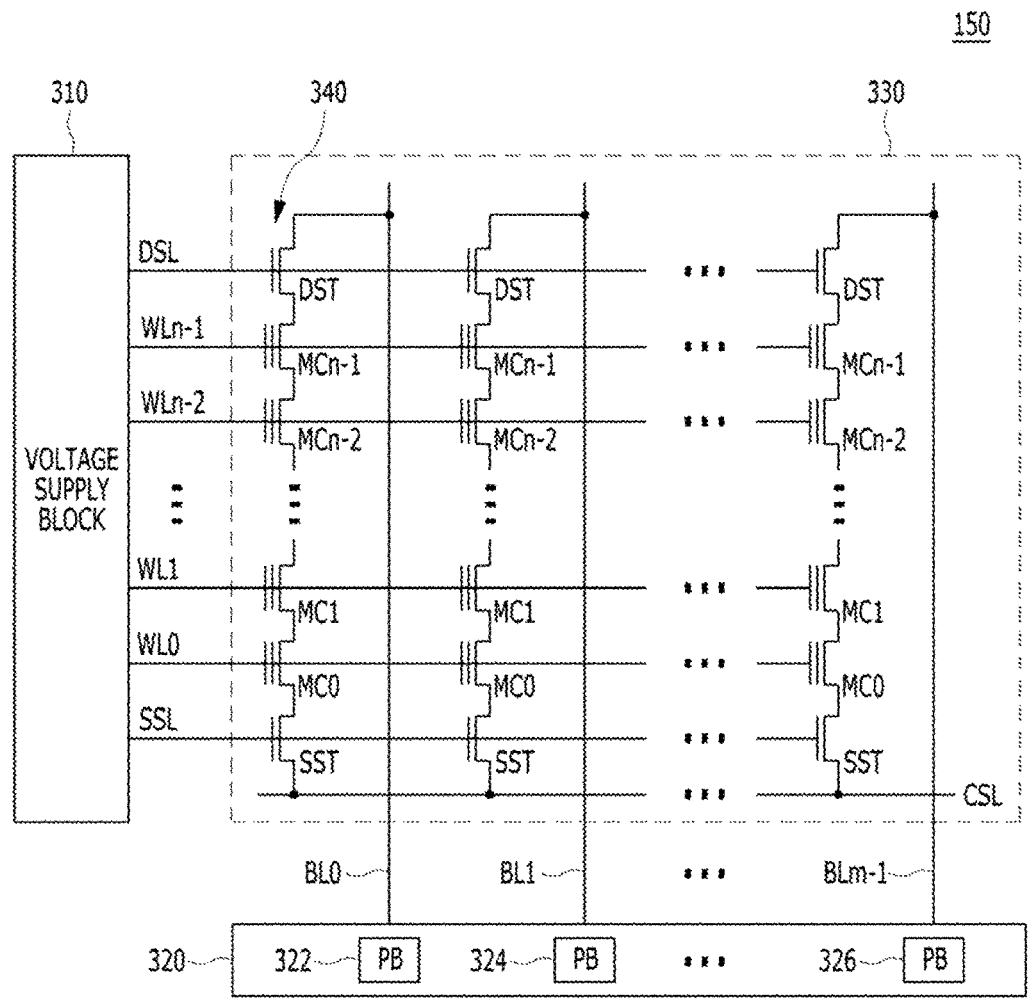
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm-1. The cell string 340 of each column may include one or more drain select transistors DST and one or more source select transistors SST. Between the select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
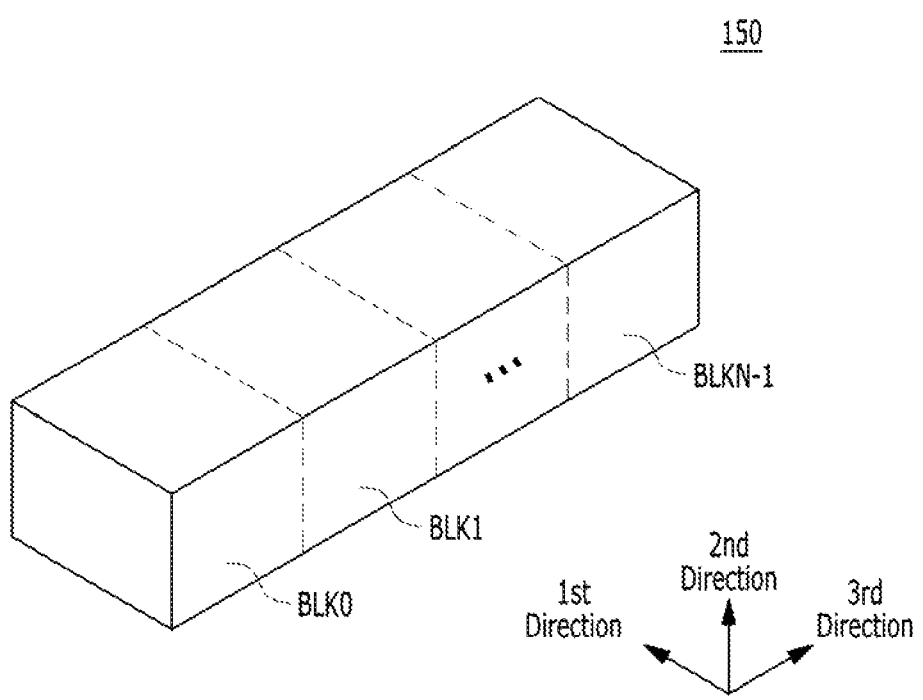
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each of the memory blocks having a 3D structure (or vertical structure).

FIGS. 5 to 8 are schematic diagrams illustrating a data processing operation to a memory device in a memory system in accordance with an embodiment.

Hereinbelow, in the embodiment of the present disclosure, descriptions will be made, as an example, for data processing in the case where, after storing write data corresponding to the write command, in the buffer/cache included in the memory 144 of the controller 130, the data stored in the buffer/cache are written and stored, that is, programmed, in a plurality of memory blocks included in the memory device 150, and map data are updated in correspondence to the program operation with respect to the memory device 150.

For example, in the embodiment of the present disclosure, after storing user data and metadata corresponding to a write command received from the host 102, in the buffer included in the memory 144 of the controller 130, the controller 130 may write and store the data (user data and metadata) stored in the buffer, in one or more arbitrary memory blocks among the plurality of memory blocks included in the memory device 150, that is, may perform a program operation.

The metadata may include logical-to-physical (L2P) map data including L2P information and physical-to-logical (P2L) map data including P2L information, for the data stored in the memory blocks in correspondence to the program operation. Also, the metadata may include an information on the command data corresponding to the command, an information on the command operation corresponding to the command, an information on the memory blocks of the memory device 150 for which the command operation is to be performed, and an information on map data corresponding to the command operation.

According to an embodiment, when data segments of the user data are stored in one or more memory blocks of the memory device 150, the controller 130 may generate and update the meta segments of the metadata, that is, the L2P segments of the L2P map data and the P2L segments of the P2L map data as the map segments of the map data, and may store the map segments in one or more memory blocks of the memory device 150. In an embodiment, the one or more memory blocks where the map segments are stored may be the same one or more memory blocks where the data segments of the user data are stored. At this time, the controller 130 updates the map segments stored in the one or more memory blocks, by loading them in the memory 144 of the controller 130.

When receiving a read command from the host 102, the controller 130 may read data from the memory device 150, store the read data in the buffer/cache included in the memory 144 of the controller 130, and then, provide the data of the buffer/cache, to the host 102.

In the embodiment of the present disclosure descriptions will be made by exemplifying data processing in the case where, after the memory system 110 is changed to a power-off state as a sudden power-off occurs while performing a program operation in a power-on state, the power of the memory system 110 is restored.

In an embodiment of the present disclosure, a booting operation and a recovery operation may be performed in the case where the power is restored after the memory system 110 is changed to the power-off state as a sudden power-off occurs in the memory system 110 while the memory system 110 performs a program operation to an arbitrary page of an arbitrary memory block among the plurality of memory blocks.

Figure 5:
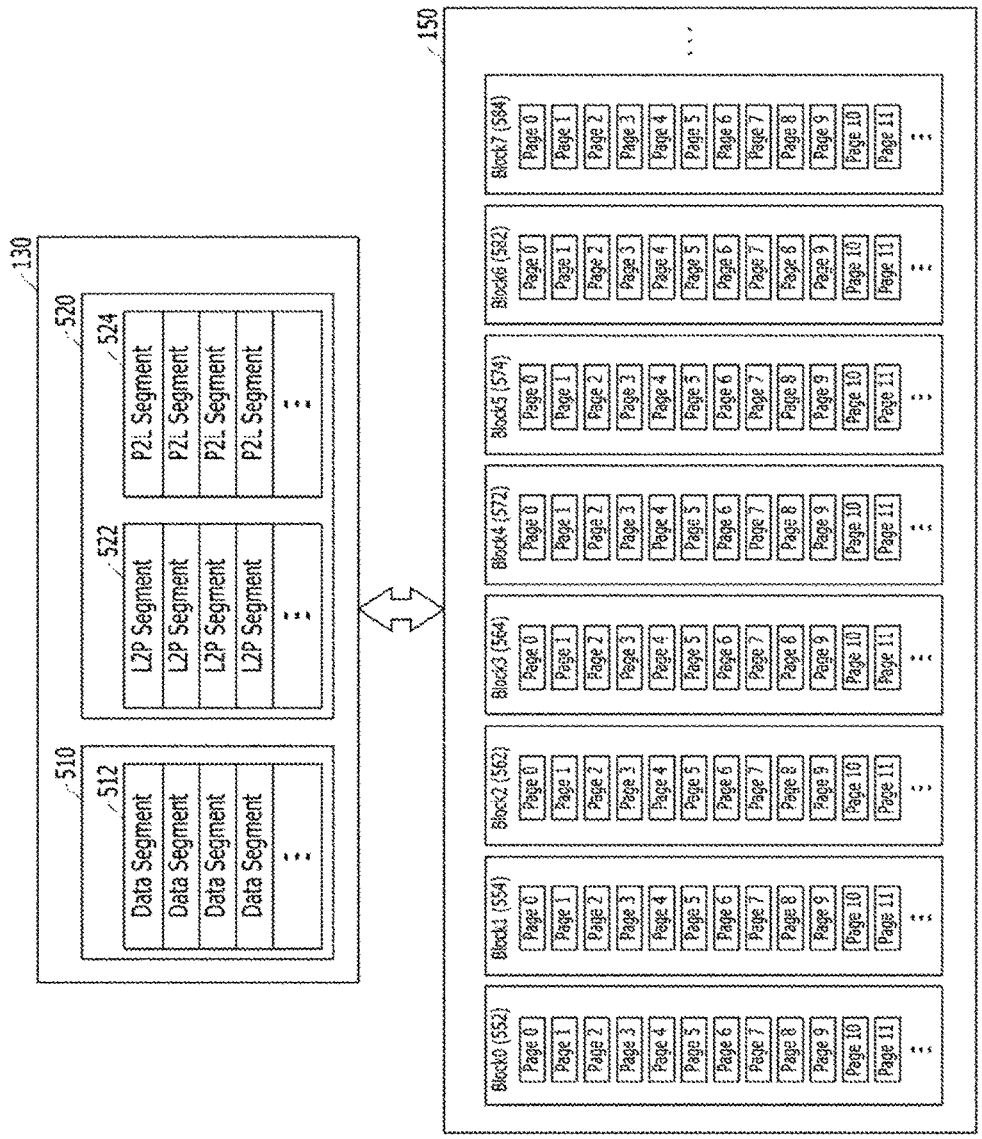

Referring to FIG. 5, the controller 130 may generate and update information indicating that the user data are stored in the pages included in the memory blocks 552 to 584, for example, L2P map data and P2L map data, that is, may generate and update the logical segments of the L2P map data, that is, L2P segments, and the physical segments of the P2L map data, that is, P2L segments, and then, stores the L2P segments and the P2L segments in the memory blocks 552 to 584.

For example, the controller 130, when performing a program operation, may first cache and buffer data segments 512 of the user data in the first buffer 510 as a data buffer/cache. Then, the controller 130 may write and store the data segments 512 of the first buffer 510 in the pages included in the memory blocks 552 to 584. According to the storage of the user data into the memory blocks 552 to 584, the controller 130 may then generate and update the L2P map data and the P2L map data and store the L2P map data and the P2L map data in a second buffer 520 included in the memory 144 of the controller 130. Namely, the controller 130 may store L2P segments 522 of the L2P map data for the user data and P2L segments 524 of the P2L map data for the user data, in the second buffer 520 as a map buffer/cache. In the second buffer 520 in the memory 144 of the controller 130, there may be stored, as described above, the L2P segments 522 of the L2P map data and the P2L segments 524 of the P2L map data, or there may be stored a map list for the L2P segments 522 of the L2P map data and a map list for the P2L segments 524 of the P2L map data. Then the controller 130 may write and store the L2P segments 522 of the L2P map data and the P2L segments 524 of the P2L map data which are stored in the second buffer 520, in the pages included in the memory blocks 552 to 584.

Also, the controller 130 loads the map segments of user data corresponding to the read command, for example, L2P segments 522 of L2P map data and P2L segments 524 of P2L map data, into the second buffer 520. After that, the controller 130 may read the user data stored in the pages included in corresponding memory blocks among the memory blocks 552 to 584, store data segments 512 of the read user data in the first buffer 510, and provide the data segments 512 to the host 102.

Figure 6:
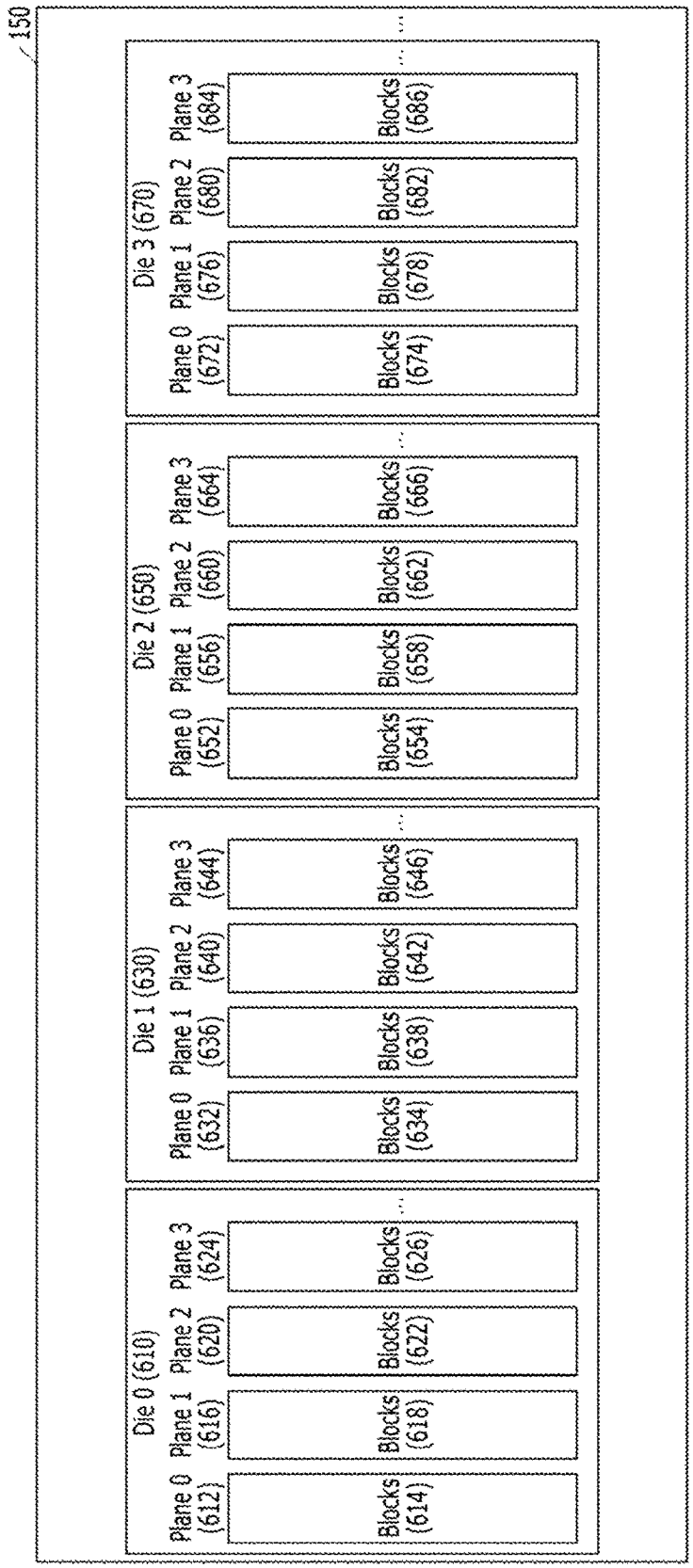

Referring to FIG. 6, the memory device 150 may include a plurality of memory dies, for example, a memory die 0 610, a memory die 1 630, a memory die 2 650 and a memory die 3 670. Each of the memory dies 610 to 670 may include a plurality of planes. For example, the memory die 0 610 may include a plane 0 612, a plane 1 616, a plane 2 620 and a plane 3 624. The memory die 1 630 may include a plane 0 632, a plane 1 636, a plane 2 640 and a plane 3 644. The memory die 2 650 may include a plane 0 652, a plane 1 656, a plane 2 660 and a plane 3 664. The memory die 3 670 may include a plane 0 672, a plane 1 676, a plane 2 680 and a plane 3 684. The respective planes 612 to 684 in the memory dies 610 to 670 may include a plurality of memory blocks 614 to 686.

Figure 7:
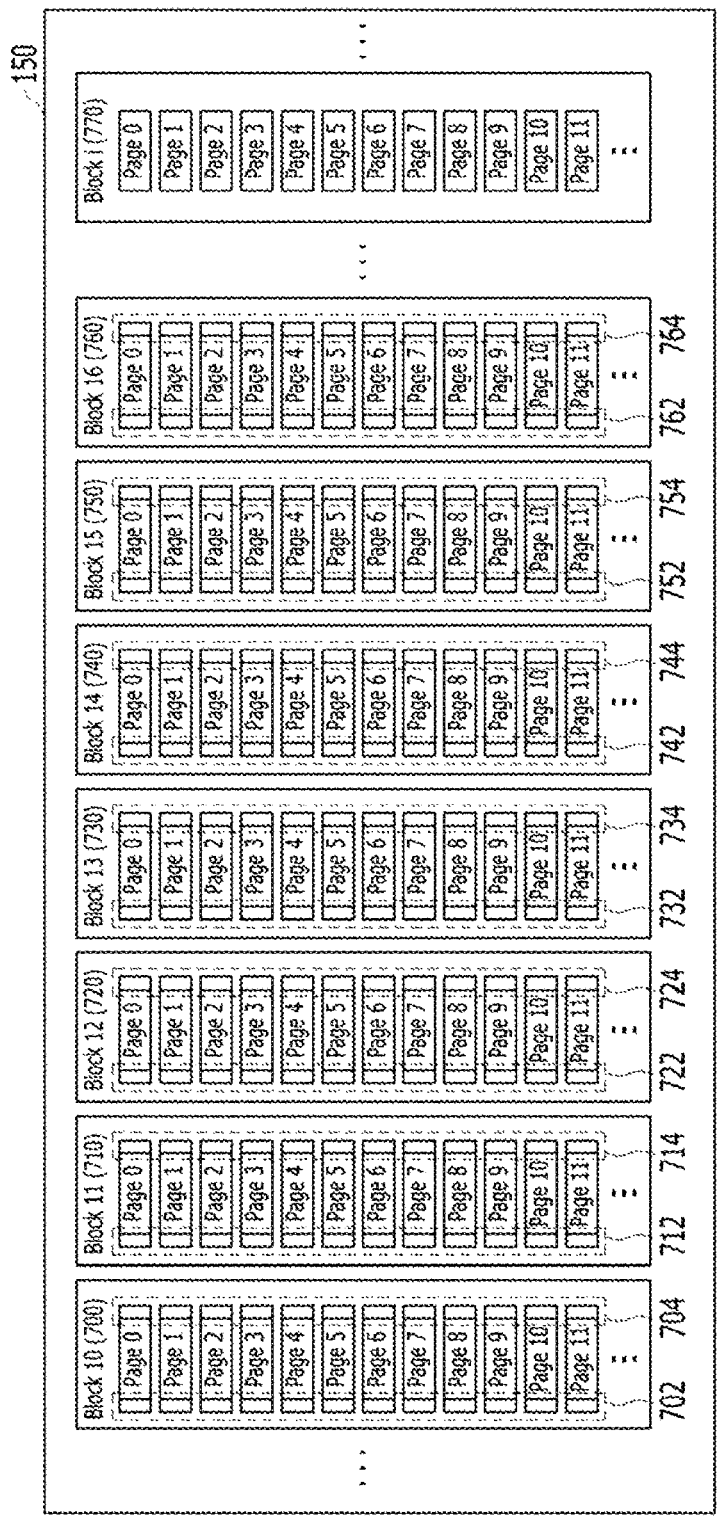

Referring to FIG. 7, the controller 130 may write and store user data corresponding to a write command in the memory blocks, for example, a memory block 10 700, memory block 11 710 and a memory block 12 720. According to the program operation to the memory block 10 700, the memory block 11 710 and the memory block 12 720, the controller 130 may generate and update map data for the user data, and may write and store the map data in different memory blocks.

Also, as a background operation to the memory device 150, the controller 130 may perform a garbage collection operation to the memory blocks, for example, a memory block 15 750 and a memory block 16 760.

The controller 130 may store the user data and the map data in different memory blocks or the same memory blocks among the memory blocks.

For example, the controller 130 may store data segments 512 of the user data in the first buffer 510 as a data buffer/cache. Then, the controller 130 may write and store the data segments 512 of the first buffer 510, in the pages included in the memory block 10 700, the memory block 11 710 and the memory block 12 720.

Then, the controller 130 may generate and update L2P segments 522 of the L2P map data and P2L segments 524 of the P2L map data, and then may write and store the L2P segments 522 and the P2L segments 524 in the pages included in the memory block 13 730 and the memory block 14 740, i.e., different memory blocks from the blocks where the corresponding user data are stored.

In more detail, the controller 130 may generate and store the L2P segments 522 and the P2L segments 524 in the second buffer 520 included in the memory 144 of the controller 130. In the second buffer 520 in the memory 144 of the controller 130, meta segments which include the L2P segments of the L2P map data and the P2L segments of the P2L map data or a map list for the L2P segments of the L2P map data and a map list for the P2L segments of the P2L map data. The controller 130 may write and store the L2P segments 522 and the P2L segments 524 of the second buffer 520 in the pages included in the memory block 13 730 and the memory block 14 740.

Further, the controller 130 may perform a garbage collection operation. For example, the controller 130 may select as source memory blocks the memory block 15 750 and the memory block 16 760 among the memory blocks, check valid pages in the source memory blocks, and copy and store the valid data of the valid pages of the source memory blocks in the pages of target memory blocks. The controller 130 may select as target memory blocks empty memory blocks among the memory blocks included in the memory device 150.

In the case of storing the data segments 512 of the first buffer 510 in the pages included in the memory block 10 700, the memory block 11 710 and the memory block 12 720, the controller 130 may generate a checkpoint information in header regions 702, 712 and 722 and/or tail regions 704, 714 and 724 of the pages included in the memory block 10 700, the memory block 11 710 and the memory block 12 720 or in the pages included in a dedicated memory blocks, for example, a memory block i 770, among the memory blocks included in the memory device 150.

In the case of a map flush operation, i.e., a program operation of the map data of storing the L2P segments 522 of the L2P map data and the P2L segments 524 of the P2L map data of the second buffer 520 in the pages included in the memory block 13 730 and the memory block 14 740, the controller 130 generates a checkpoint information in header regions 732 and 742 and/or tail regions 734 and 744 of the pages included in the memory block 13 730 and the memory block 14 740 or in the pages included in the dedicated memory block i 770.

In the case of performing a garbage collection operation to the memory block 15 750 and the memory block 16 760, the controller 130 generates a checkpoint information in header regions 752 and 762 or tail regions 754 and 764 of the pages included in the memory block 15 750 and the memory block 16 760 or in the pages included in the memory block i 770.

Referring to FIG. 8, a checkpoint information 800 may indicate one or more operations performed to the memory blocks of the memory device 150, for example, may include operation indexes 802 indicating corresponding operations, memory block indexes 804 of memory blocks as targets of the corresponding operations, and information indicating starts 806 and ends 808 of the corresponding operations. The checkpoint information 800 may be stored in the form of a list table as shown in FIG. 8 or in the form of a bitmap.

For example, the controller 130 may perform a program operation of writing and storing the data segments 512 in the memory blocks, as a user data operation 810. The user data operation 810 may include a program operation of storing user data in the memory blocks, or a read operation of reading user data from the memory blocks of the memory device 150.

According to the user data operation 810 to the memory block 10 700, the memory block 11 710 and the memory block 12 720, the controller 130 records in the checkpoint information 800 that the user data operation 810 is performed to the memory block 10, the memory block 11 and the memory block 12.

For example, at a first time when the memory system 110 is in a power-on state, in the case where the user data operation 810 has started and ended to the memory block 10 700, the user data operation 810 has started and is being performed to the memory block 11 710, and the user data operation 810 to the memory block 12 720 has not yet started, the controller 130 records, in entries 812, 814 and 816 respectively for the memory blocks 10 to 12 in the checkpoint information 800, the starts 806 and the ends 808.

According to the user data operation 810 to the memory block 10 700, the memory block 11 710 and the memory block 12 720, the controller 130 performs a map flush operation as a map data operation 820 of generating and updating the L2P segments 522 and P2L segments 524, and writing and storing the map segments of the map data in the memory blocks of the memory device 150. The map data operation 820 may include a map generation operation, a map update operation and a map flush operation in correspondence to the program operation corresponding to the write command or a map loading operation, and may include a map update operation in correspondence to a background operation to the memory device 150.

As the controller 130 stores the L2P segments 522 of the L2P map data and the P2L segments 524 of the P2L map data in the memory block 13 730 and the memory block 14 740, the controller 130 records in the checkpoint information 800 that the map data operation 820 is being performed to the memory block 13 and the memory block 14 but has not yet been completed as indicated by the start (806) and end (806) informations.

For example, at the first time when the memory system 110 is in the power-on state, in the case where the map data operation 820 has started and is being performed to the memory block 13 730 and the memory block 14 740, the controller 130 records, in entries 822 and 824 respectively for the memory blocks 13 and 14 in the checkpoint information 800, the starts 806 and the ends 808 as illustrated in FIG. 8.

The controller 130 may perform a background operation such as a garbage collection operation to the memory blocks 15 750 and 16 760. Other examples, of a background operation may include a wear leveling operation, or a bad block management operation. When performing the garbage collection operation 830, the controller 130 then records, in the checkpoint information 800 that the garbage collection operation 830 is performed to the memory blocks 15 and 16 using the block indexes 804.

For example, at the first time when the memory system 110 is in the power-on state, in the case where the garbage collection operation 830 has started and is being performed to the memory block 15 750, and the garbage collection operation 830 has started and ended to the memory block 16 760, the controller 130 records in entries 832 and 834 respectively for the memory blocks 15 and 16 in the checkpoint information 800, the starts 806 and the ends 808 as illustrated in FIG. 8.

For example, a sudden power-off may occur while the controller 130 performs the user data operation 810, the map data operation 820 and the garbage collection operation 830 to the memory blocks 700 to 760 which have the status as indicated by the checkpoint information 800 at a first time when the sudden power off occurs. Then, the controller 130 may perform a booting operation and a recovery operation to the memory system 110 when the power is restored. Accordingly, when the power is restored and the memory system 110 gets back in a power-on state, the controller 130 may check the checkpoint information 800 which is recorded in the header regions 702 to 762 and/or the tail regions 704 to 764 of the pages included in the memory blocks 700 to 760 or the checkpoint information 800 recorded in the pages of the dedicated memory block i 770.

In the entries 812 to 834 respectively for the memory blocks 10 to 16, which are identified by the block indexes 804, in the checkpoint information 800, the starts 806 and the ends 808 of the user data operation 810, the map data operation 820 and the garbage collection operation 830, which are identified by the operation indexes 802, were recorded at the first time when the sudden power off occurred.

After checking the recorded checkpoint information 800 which includes the starts and the ends of the corresponding operations to the respective memory blocks 700 to 760, the controller 130 may then perform a recovery operation to the respective memory blocks 700 to 760.

In detail, the controller 130 checks through the checkpoint information 800 that, at the first time, the user data operation 810 to the memory block 10 700 had been started and had been completed, the user data operation 810 to the memory block 11 710 had been started but had not been completed, and the user data operation 810 to the memory block 12 720 had not been yet started. Accordingly, the controller 130 may then first perform a dummy write operation only to the memory block 11 710, to which the user data operation 810 had been started but had not been completed at the first time when the sudden power-off occurred. After the dummy operation to the memory block 11 710 is completed, the controller may then perform the recovery operation to the memory block 10 710, the memory block 11 710 and the memory block 12 720. The dummy write operation to the memory block 11 710, may include the controller 130 writing dummy data into a page next to a page to which the user data operation 810 was performed at the first time among the pages included in the memory block 11 710.

Also, the controller 130 may check through the checkpoint information 800 that the map data operation 820 to the memory block 13 730 and the memory block 14 740 had been started but had not been completed at the first time when the sudden power off occurred. Based on this information, the controller 130 may then first perform a dummy write operation to each of the memory blocks 13 730 and 14 740. Then, after the dummy operation to each of the memory blocks 13 730 and 14 740 is completed, the controller 130 may perform the recovery operation to each of the memory blocks 13 730 and 14 740. The dummy write operation to the memory blocks 13 730 and 14 740, may include the controller 130 writing dummy data into pages next to pages for which the map data operation 820 is performed at the first time among the pages included in the memory blocks 13 730 and 14 740.

Moreover, the controller 130 may also check through the checkpoint information 800 that, at the first time when the sudden power off occurred, the garbage collection operation 830 to the memory block 15 750 had been started but had not been completed, and the garbage collection operation 830 to the memory block 16 760 had been started and had been completed. Then, based on this information, the controller 130 may perform a dummy write operation only to the memory block 15 750, to which the garbage collection operation 830 was being performed at the first time when the sudden power off occurred. Then, after the dummy operation to the memory block 15 750 is completed, the controller 130 may perform the recovery operation to the memory blocks 15 750 and 16 760. The dummy write operation to the memory block 15 750 may include the controller 130 writing dummy data into a page next to a page for which the garbage collection operation 830 is performed at the first time among the pages included in the memory block 15 750.

In this way, the controller 130 may check the start and end information of corresponding operations to respective memory blocks 700 to 760, and then, perform selectively a dummy write operation to one or more of the respective memory blocks 700 to 760, to which a corresponding operation a corresponding one among the user data operation 810, the map data operation 820, and the garbage collection operation 830) had started but had not being completed, i.e., was being performed at the time of the sudden power-off.

Therefore, in an embodiment of the present disclosure, in the case where the memory system 110 comes back from a power-off, which occurred while a user data operation, a map data operation or a background operation was being performed, a booting operation and a recovery operation are performed by checking the operation status of corresponding operations to the respective memory blocks, and then, a dummy write operation is selectively performed only to those of the memory blocks to which a corresponding operation (i.e., a corresponding one among a user data operation, a map data operation, or a background operation) was being performed at the time of the power-off. As a result, a write operation of dummy data may be minimized, the numbers of pages in which the dummy data are to be written in the respective memory blocks may be minimized, and accordingly, the utilization efficiency of the memory blocks in the memory device 150 may be significantly improved.

Figure 9:
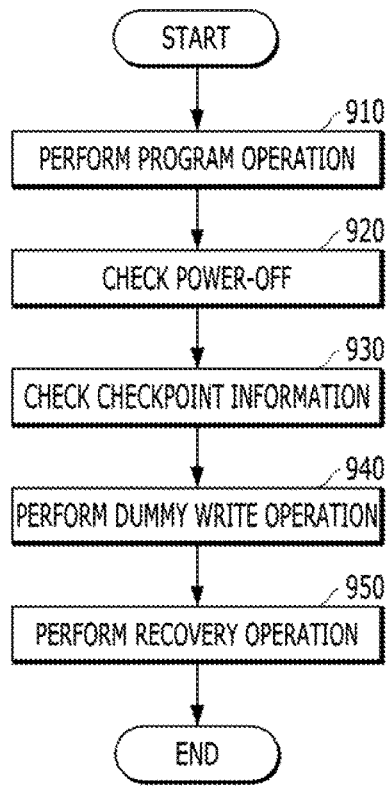
FIG. 9 is a representation of an example of a flow chart illustrating an operation of a memory system in accordance with an embodiment.

FIG. 9 is a representation of an example of a flow chart illustrating an operation of a memory system in accordance with an embodiment of the present invention.

Referring to FIG. 9, at step 910, the memory system 110 may perform a command operation corresponding to a command received from the host 102. The command operation may be a read or a program operation. In FIG. 9, as an example, it is illustrated that in step 910, a program operation is performed corresponding to a write command received from the host 102. The command operation may include user data operation 810, and a map data operation 820 corresponding to a program operation or a read operation, and a background operation 830, for example, a garbage collection operation. At this time, information indicating the starts and the ends 806, 808 of corresponding operations 802 to the respective memory blocks 804 may be recorded in the checkpoint information 800, as it was described with reference to FIG. 8. The checkpoint information 800 may be stored in the header regions 702 to 762 and/or the tail regions 704 to 764 of the pages included in the memory blocks 10 to 16, or may be stored in the pages of a dedicated memory block 770 among the memory blocks of the memory device 150.

At step 920, in the case where a sudden power-off occurs in the memory system 110 while the memory system 110 performs a program operation in a power-on state, the sudden power-off of the memory system 110 is checked, that is, it is checked that the memory system 110 is changed to a power-off state.

At step 930, in the case where the power is restored and the memory system 110 comes back from the sudden power-off, the checkpoint information 800 for the memory blocks 10 to 16 is checked.

At step 940, after checking the starts 806 and the ends 808 of corresponding operations 802 to the respective memory blocks 804 through the checkpoint information 800 for the memory blocks 10 to 16, a dummy write operation is performed selectively for the memory blocks, to which a corresponding operation (i.e., a corresponding one among a user data operation, a map data operation, and a background operation) was being performed at the time of the sudden power-off.

Then, at step 950, a recovery operation is performed for the memory blocks of the memory device 150 due to the sudden power-off of the memory system 110.

Since detailed descriptions were made above with reference to FIGS. 5 to 8, for performing of a command operation corresponding to a command, for example, a user data operation and a map data operation, performing of a background operation for the memory blocks included in the memory device 150, for example, a garbage collection operation, checking of a checkpoint information which indicates the starts and ends of corresponding operations in the respective memory blocks, and performing of a booting operation and a recovery operation for the memory blocks in the case where a sudden power-off occurs in the memory system, in particular, selective performing of a dummy write operation in the respective memory blocks through the checkpoint information, further descriptions thereof will be omitted herein.

Hereinbelow, detailed descriptions will be made with reference to FIGS. 10 to 18, for a data processing system and electronic appliances to which the memory system 110 including the memory device 150 and the controller 130 described above with reference to FIGS. 1 to 9, in accordance with the embodiment, is applied.

FIGS. 10 to 18 are diagrams schematically illustrating application examples of the data processing system of FIG. 1.

Figure 10:
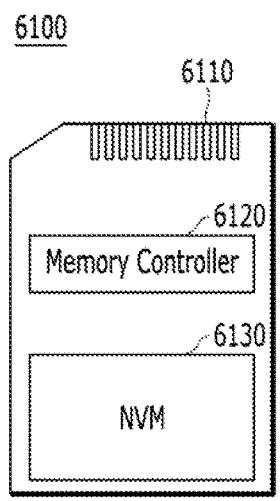
FIGS. 10 to 18 are diagrams schematically illustrating application examples of the data processing system of FIG. 1 in accordance with various embodiments of the present invention.

FIG. 10 is a diagram schematically illustrating another example of the data processing system including the memory system in accordance with the present embodiment. FIG. 10 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC) peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
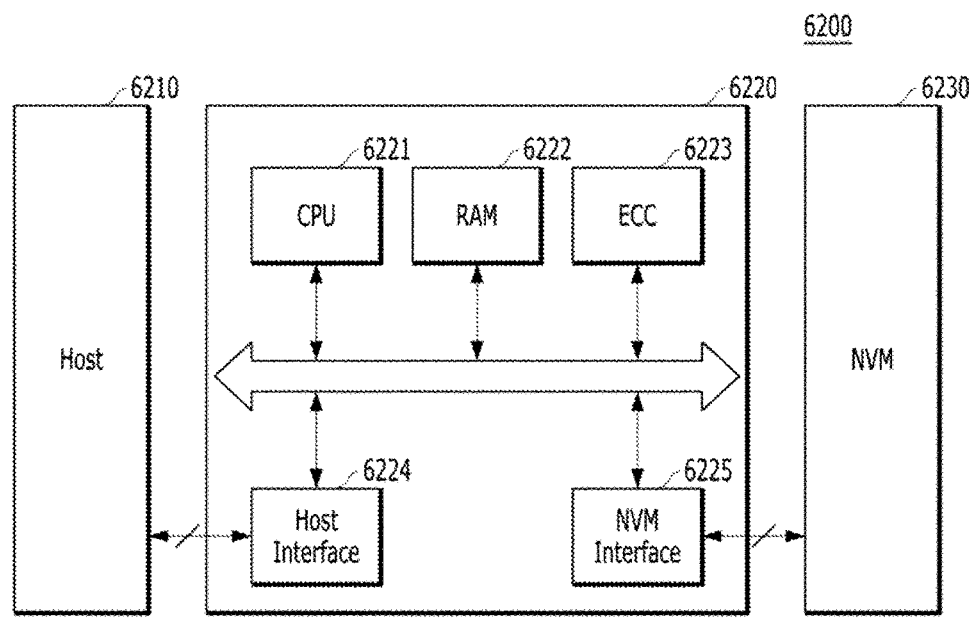

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
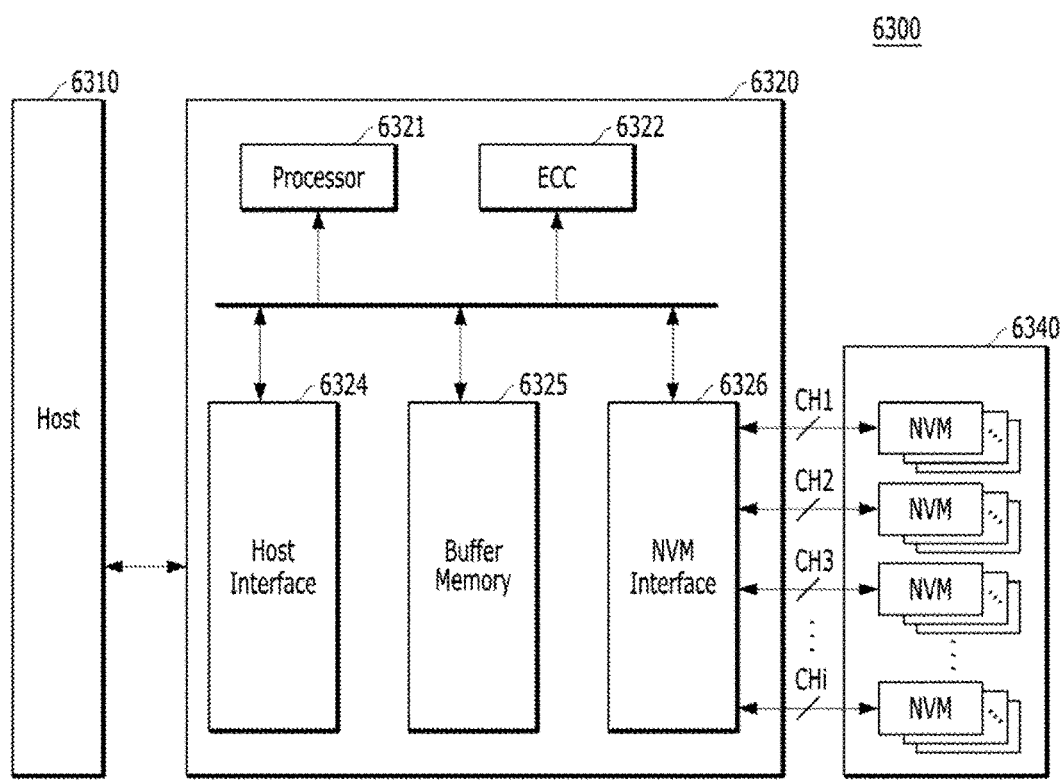

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
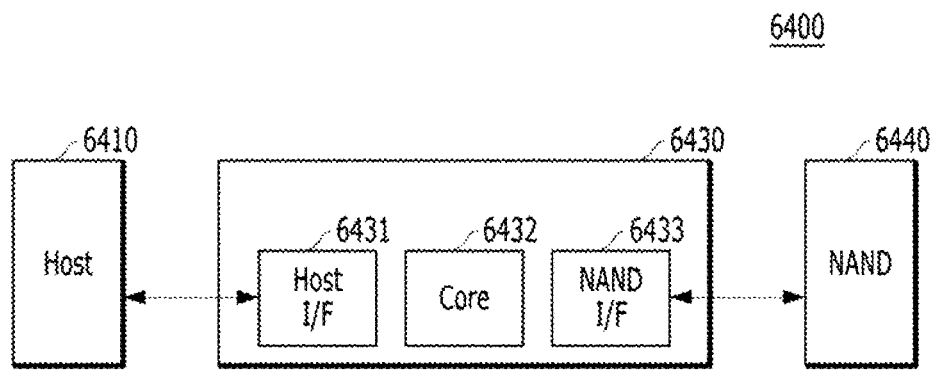

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 14 to 17 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
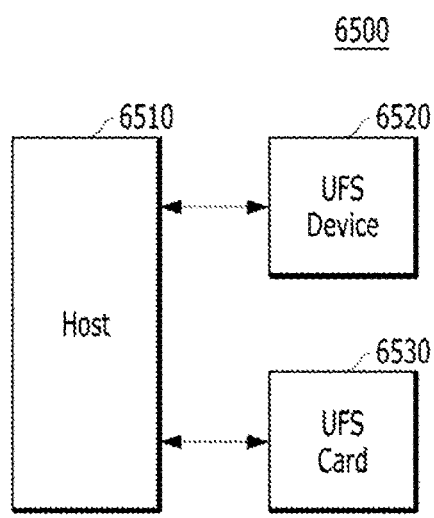

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
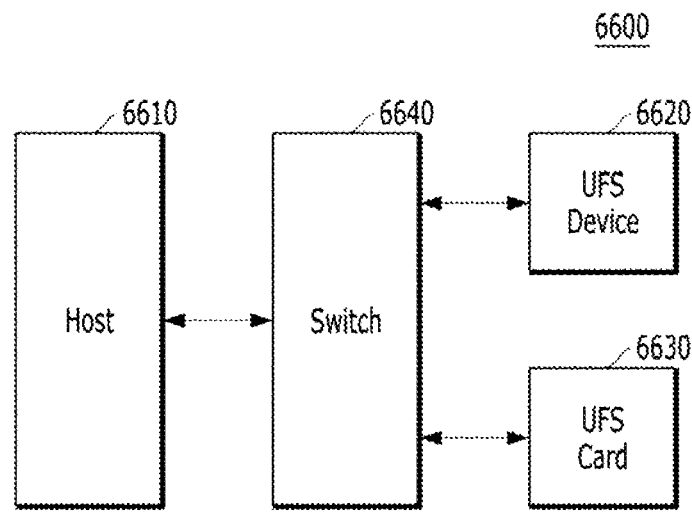

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
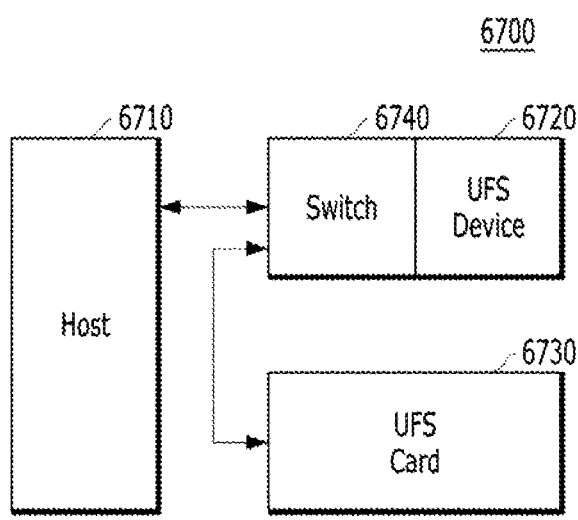

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
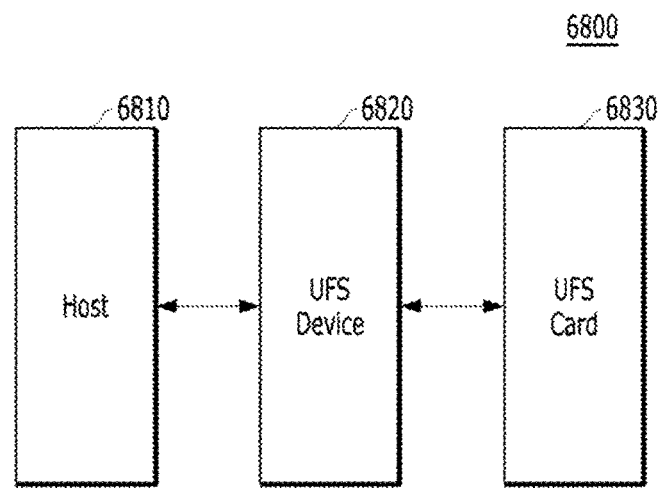

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
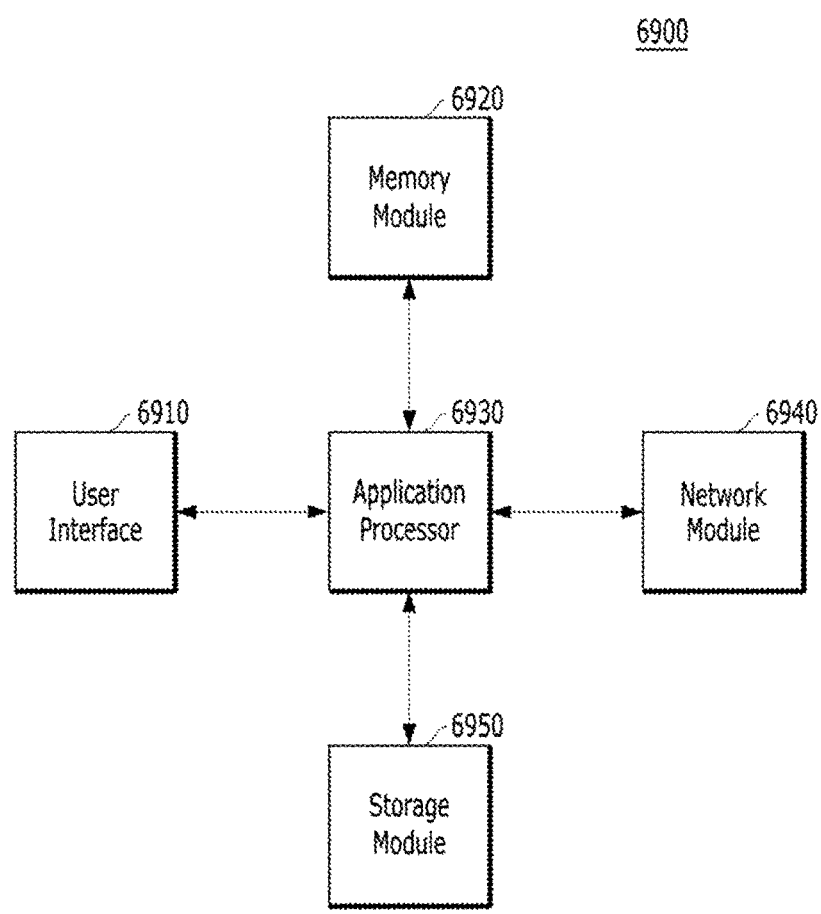

FIG. 18 is a diagram schematically illustrating another example of the data processing system including the memory system in accordance with an embodiment. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may he used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory blocks, each memory block having a plurality of pages; and
a controller suitable for performing a plurality of operations, including a user data operation, a map data operation and a background operation, onto plural first memory blocks among the memory blocks at a first time before a power provided into the memory device is off, recording a checkpoint information including which operation is performed onto at least one of the first memory blocks and whether each operation performed onto at least one memory block is begun or ended, selecting at least one second memory block among the first memory blocks based on the checkpoint information at a second time after a power-off in the memory system while performing the plurality of operations, and performing a dummy write operation to the at least one second memory block after the power is provided into the memory device,
wherein the at least one second memory block recognized based on the recorded checkpoint information is a memory block where the at least one operation is begun but not completed at the first time.

2. The memory system according to claim 1, wherein the controller performs the dummy write operation by writing dummy data into pages next to pages to which the corresponding operations were being performed at the first time among pages included in the second memory blocks.

3. The memory system according to claim 1, wherein the controller further performs a recovery operation to the first memory blocks after the dummy writing operation.

4. The memory system according to claim 1, wherein the controller records the checkpoint information in at least one of a header region and a tail region of a page included in the first memory blocks.

5. The memory system according to claim 1, wherein the controller records the checkpoint information in a page included in a dedicated memory block among the memory blocks.

6. The memory system according to claim 1, wherein the checkpoint information is configured in at least one of a list table form and a bitmap form.

7. The memory system according to claim 1, wherein the checkpoint information includes indexes indicating the operations, indexes indicating the first memory blocks, and information indicating the starts and the ends of the operations.

8. A method for operating a memory system including a plurality of memory blocks, each memory block having a plurality of pages, the method comprising:
performing a plurality of operations, including a user data operation, a map data operation and a background operation, onto plural first memory blocks among the memory blocks at a first time before a power provided into the memory device is off,
recording a checkpoint information including which operation is performed onto at least one of the first memory blocks and whether each operation performed onto at least one memory block is begun or ended,
selecting at least one second memory block among the first memory blocks based on the checkpoint information at a second time after a power-off in the memory system while performing the plurality of operations, and performing a dummy write operation to the at least one second memory block after the power is provided into the memory device, wherein the at least one second memory block recognized based on the recorded checkpoint information is a memory block where the at least one operation is begun but not completed at the first time.

9. The method according to claim 8, wherein the performing of the dummy write operation includes writing dummy data into pages next to pages to which the corresponding operations were being performed at the first time among pages included in the second memory blocks.

10. The method according to claim 8, further comprising performing a recovery operation to the first memory blocks after performing of the dummy writing operation.

11. The method according to claim 8, wherein the checkpoint information is recorded in at least one of a header region and a tail region of a page included in the first memory blocks.

12. The method according to claim 8, wherein the checkpoint information is recorded in a page included in a dedicated memory block among the memory blocks.

13. The method according to claim 8, wherein the checkpoint information is configured in at least one of a list table form and a bitmap form.

14. The method according to claim 8, wherein the checkpoint information includes indexes indicating the operations, indexes indicating the first memory blocks, and information indicating the starts and the ends of the operations.

* * * * *